(12) United States Patent
Huang et al.

(10) Patent No.: US 8,867,650 B2
(45) Date of Patent: Oct. 21, 2014

(54) APPARATUS AND METHOD FOR CROSS CLOCK DOMAIN INTERFERENCE CANCELLATION

(75) Inventors: Liang-Wei Huang, Hsinchu (TW); Shieh-Hsing Kuo, Hsinchu (TW); Chi-Shun Weng, Zhubei (TW); Chun-Hung Liu, New Taipei (TW)

(73) Assignee: Realtek Semiconductor Corp., Science Park, Hsinchu (TW)

( * ) Notice: Subject to any disclaimer, the term of this patent is extended or adjusted under 35 U.S.C. 154(b) by 225 days.

(21) Appl. No.: 13/396,589

(22) Filed: Feb. 14, 2012

(65) Prior Publication Data

US 2012/0213306 A1      Aug. 23, 2012

(30) Foreign Application Priority Data

Feb. 17, 2011  (TW) ................................ 10105195 A

(51) Int. Cl.
*H04B 15/00*      (2006.01)

(52) U.S. Cl.
USPC ........... 375/285; 375/134; 375/137; 375/144; 375/148; 375/254; 375/346; 375/E1.02; 375/E1.029; 375/E1.03; 375/E1.031; 375/355; 455/570; 455/295; 455/296; 455/63.1; 370/286

(58) Field of Classification Search
USPC ......... 375/134, 137, 144, 148, 254, 285, 346, 375/E1.02, E1.029, E1.03, E1.031, 355; 455/570, 295, 296, 63.1; 370/286
See application file for complete search history.

(56) References Cited

U.S. PATENT DOCUMENTS 6,307,905 B1 *  10/2001  Agazzi .......................... 375/371
8,204,152 B2 *   6/2012  Huang et al. ................... 375/316

* cited by examiner

*Primary Examiner* — Rahel Guarino
(74) *Attorney, Agent, or Firm* — IPR Works, LLC

(57) ABSTRACT

An apparatus and method for cross clock domain interference cancellation is provided to a communication system which includes a transmitter operated in a first clock domain and a receiver operated in a second clock domain. The apparatus comprises a First-In-First-Out (FIFO) circuit and a cancellation signal generator. The FIFO circuit receives a digital transmission signal of the transmitter in the first clock domain, and outputs the digital transmission signal in the second clock domain according to an accumulated timing difference between the first and second clock domains. The cancellation signal generator generates a cancellation signal for canceling an interference signal received by the receiver according to the digital transmission signal outputted by the FIFO circuit. The interference signal is generated in response to the digital transmission signal. The cancellation signal generator adjusts the cancellation signal according to a phase difference between the interference signal and the cancellation signal.

22 Claims, 6 Drawing Sheets

APPARATUS AND METHOD FOR CROSS CLOCK DOMAIN INTERFERENCE CANCELLATION

This application claims the benefit of Taiwanese Patent Application Serial No. 100105195, filed on Feb. 17, 2011, the subject matter of which is incorporated herein by reference.

BACKGROUND OF INVENTION

1. Field of the Invention

The invention relates to an apparatus and a method that can perform an interference cancellation, and more particularly to an apparatus and the corresponding method that can perform cancelling of the cross clock domain interference.

2. Description of the Prior Art

In the conventional communication system, interference cancellation during performing the task of cross clock domain usually introduces the Farrow structure to process the interpolating calculation so as to transform corresponding data among different clock domains. In the art, the Farrow structure adopts a relevant polynomial to simplify the complicity of the interpolating calculation. Yet, it is well known that the application of the mathematical polynomial combinations is always lead to an inevitable result of substantial computational errors or bias. It is general to note that the maximum computational error will fall at the point having a 180-degree phase. Also, in the case of meeting the particular inputs and outputs for two close clock domains, the computational error might rise to a degree that the introduction of the Farrow structure seems meaningless. In particular, when the two clock domains are almost the same for the inputs and the outputs, a correct computation to obtain interpolated data having 180-degree phases is extremely impossible from a Farrow-structure scheme.

For example, in the application of HDMI Ethernet channel, due to the feature of bi-direction transmission on a single cable, interference may arise from the incoming signals and the echo of the outgoing signals. In the art, an echo canceller is usually introduced to perform the cancellation of the echoes. For the opposing ends of the HDMI Ethernet channel exist a tiny clock domain error of 0~200 ppm, data at the transmitter end (Tx) needs to undergo clock domain switching to transform into data having the clock domain of the receiver end (Rx), and then the echo canceller can be applied to the clock domain of the Rx. In this application, if the Farrow structure is introduced to process the clock domain switching, the interpolating accuracy would be poor due to the tiny difference between clock domains of Tx and Rx. Accordingly, for obtaining a satisfied computational precision from the Farrow structuring, a high-order polynomial is inevitable, but trade-off is a large number of taps in the Farrow structure. As a result, the computational complexity is high and the time delay in signaling is usually prolonged.

Further, another disadvantage from using the Farrow structure is the increase of the computational complexity at the echo canceller end. In the HDMI Ethernet channel, if an MLT-s signal emitted from transmitter end Tx has three value levels (0、+1、-1), then no clock domain switching is needed, and the echo canceller needs to perform additions only with no need of multiplication operation. However, by involving the Farrow structure for obtaining the interpolated data with different phases and timings, more bits are needed to realize the data of Tx. Definitely, in this situation, it can be foreseen that multiplication operations in the echo canceller is inevitable and the computational complexity thereof may arise comprehensively as well.

SUMMARY OF THE INVENTION

Accordingly, it is the primary object of the present invention to provide an apparatus and a corresponding method for interference cancellation so as to target at the interference cancellation in crossing clock domains and thereby to reduce the complexity in system structuring and signal processing.

In one embodiment of the present invention, the interference cancellation apparatus is applied to a communication system that includes a transmitter operated in a first clock domain and a receiver operated in a second clock domain. The interference cancellation apparatus can include a First-In-First-Out (FIFO) circuit and a cancellation signal generator. The FIFO circuit receives a digital transmission signal of the transmitter in the first clock domain, and outputs the digital transmission signal in the second clock domain according to an accumulative timing difference between the first and the second clock domains. The cancellation signal generator generates a cancellation signal for canceling an interference signal received by the receiver according to the digital transmission signal outputted by the FIFO circuit. The interference signal is generated in response to the digital transmission signal. The cancellation signal generator adjusts the cancellation signal according to a phase difference between the interference signal and the cancellation signal.

In one embodiment of the present invention, the interference cancellation method is applicable to a communication system including a transmitter operated in a first clock domain and a receiver operated in a second clock domain. The interference cancellation method includes the steps of: receiving a digital transmission signal from the transmitter in the first clock domain; outputting the digital transmission signal in the second clock domain according to an accumulative timing difference between the first and the second clock domains; and generating a cancellation signal for cancelling an interference signal received by the receiver according to the digital transmission signal outputted by the FIFO circuit. In the present invention, the interference signal is generated in response to the digital transmission signal. The cancellation signal generator adjusts the cancellation signal according to a phase difference between the interference signal and the cancellation signal.

All these objects are achieved by the apparatus and the method for cross clock domain interference cancellation described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an apparatus and a method for cross clock domain interference cancellation. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
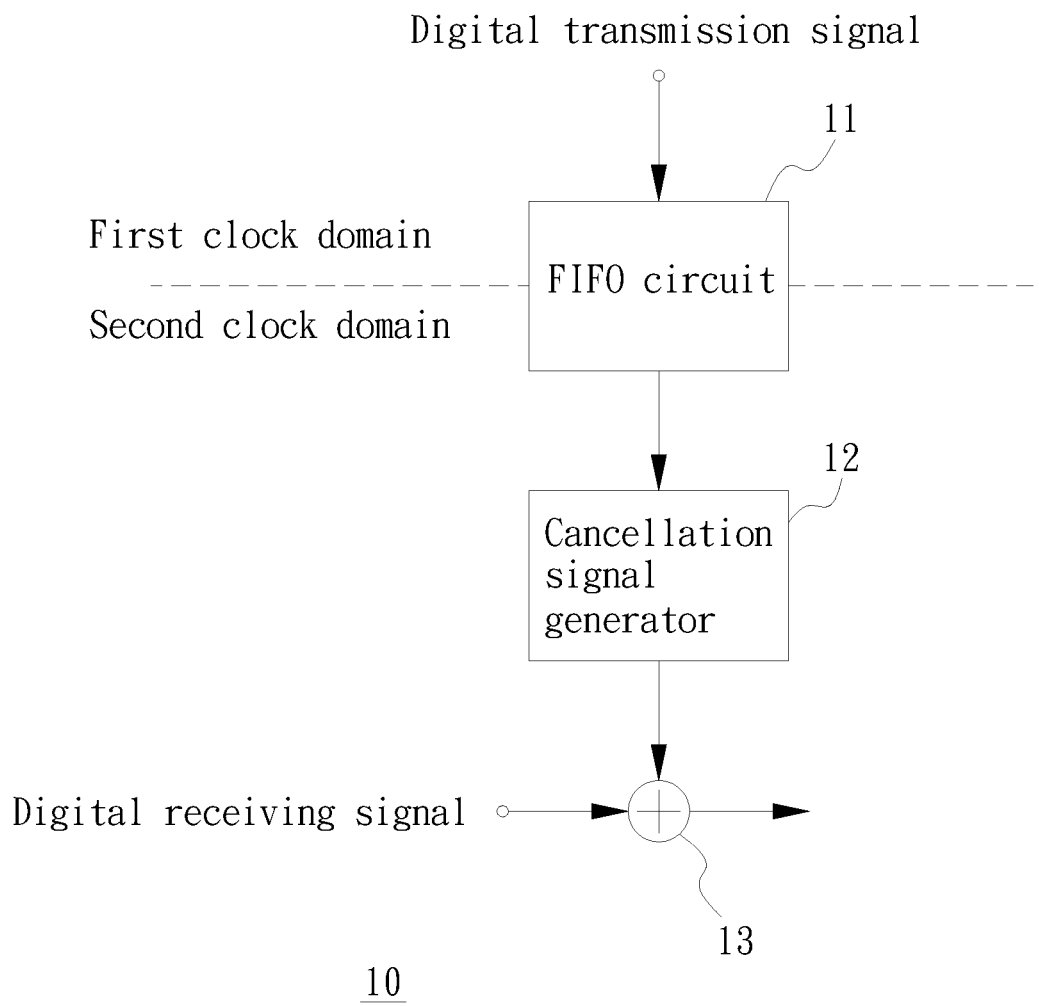
FIG. 1 is a block diagram showing the logics of the interference cancellation apparatus in accordance with the present invention.

Referring now to FIG. 1, a simple block diagram is used to demonstrate the inventive logics of the interference cancellation apparatus 10 in accordance with the present invention. The interference cancellation apparatus 10 is applicable to a communication system for cancelling possible interference formed during a signal transmission operation. The communication system includes a transmitter operated in a first clock domain and a receiver operated in a second clock domain. In some specific system combinations, the transmission signal outputted from the transmitter end might generate particular interference at the receiver end during a normal signal transmission process. For instance, in the case that the transmitter and the receiver are located at the same side of a channel, an echo of a signal sent by the transmitter would be received by the receiver through the channel. In the case that the transmitter and the receiver are located at different channels, the receiver might be interfered by the cross-talk caused by the response signal of the receiver itself to the transmission signal from the transmitter. In the present invention, the interference cancellation apparatus 10 can generate a corresponding cancellation signal according to the transmission signal of the transmitter so as to cancel the interference within the received signal of the receiver. However, for the transmission signal and the received signal are attributed to the first clock domain and the second clock domain, the interference cancellation apparatus 10 needs to perform the task of cross clock interference cancellation.

As shown in FIG. 1, the interference cancellation apparatus 10 includes a First-In-First-Out (FIFO) circuit 11, a cancellation signal generator 12 and an adder 13. The FIFO circuit 11 can receive a digital communication signal of the transmitter in the first clock domain, and can output the digital communication signal in the second clock domain according to an accumulated timing error between the first clock domain and the second clock domain. The FIFO circuit 11 is mainly to control the order and the rate of I/O signals, not to process the magnitude of the signal. In particular, the FIFO circuit 11 can adjust the output signal for clock domain switching according to the accumulated timing difference between the input clock domain (i.e. the first clock domain) and the output clock domain (i.e. the second clock domain). Details thereabout would be further elucidated in the following sections.

The cancellation signal generator 12 can generate a cancellation signal for cancelling an interference signal received by the receiver according to the digital transmission signal outputted by the FIFO circuit 11. The interference signal is generated in response to the digital communication signal. In particular, the cancellation signal generator 11 can judge a phase difference between the interference signal and the cancellation signal and can further adjust the cancellation signal accordingly so as to reduce or diminish the phase difference. For the receiver can receive simultaneously the interference signal and the data sent from a communication party (i.e. the interference signal forms a part of a digital receiving signal of the receiver), the interference cancellation apparatus 10 has the adder 13 coupling with the cancellation signal generator 12 and a signal-receiving path of the receiver, such that the cancellation signal can be subtracted from the digital receiving signal before a signal output is performed.

As shown in FIG. 1, the interference cancellation across different clock domains is processed by two parts. If the aforesaid digital transmission signal includes a plurality of consecutive sampled points in the first clock domain, then each the sampled point can be treated as an integer point at a corresponding time axis, and the interval of two adjacent points can be defined as a clock period of the first clock domain. In the art, the application of Farrow structure is to interpolate the values of corresponding sampled points in the second clock domain according to the existing integer points. Therefore, in the second clock domain, each sampled point of the digital transmission signal at the time axis would deviate from the original integer point. On the other hand, by introducing the interference cancellation apparatus 10 of the present invention, the non-integer point at the time axis in the second clock domain is separated into an integral portion and a decimal portion, while the conventional complicate interpolation calculation is abandoned. For example, if a sampled point is located at x·y (x for the digital of the integral portion and y for the digital of the decimal portion), then x·y would be separated into an x portion and a 0·y portion. Firstly in processing the integral portion x, the FIFO circuit 11 outputs the corresponding integer point at x in the first clock domain at an output timing of x.y (i.e. according to the rate in the second clock domain). For the rate difference between the first and the second clock domains, the FIFO circuit 11 needs to evaluate the accumulated timing difference in between and so as to output more sampled points in a single relevant time (while the first clock domain is faster than the second clock domain), or to skip an output timing by having no sampled point output (while the first clock domain is slower than the second clock domain). Upon such an arrangement, the FIFO circuit 11 can avoid the possibility of overflowing or underflowing. Further, at this timing, due to the decimal portion is yet to be handled, a phase difference between the cancellation signal and the interference signal, in which the cancellation signal is generated by the cancellation signal generator 12 in response to the output of the FIFO circuit 11. According to the phase difference, the cancellation signal generator 12 would apply a fast-convergent adaptive algorithm to hunt down the interference signals with various phases so as to locate the signal to be cancelled. Upon such an arrangement, the phase difference can be rapidly reduced or completely removed, and thereby possible bias caused by the raw decimal portion as well as the cross clock domain interference can be cancelled.

In one embodiment of the present invention, the cancellation signal generator 12 can apply the least mean square (LMS) algorithm or the recursive least squares (RLS) algorithm to track the interference signals with various phases. To assure the accuracy and a rapid convergent speed, computational step size for either the LMS algorithm or the RLS algorithm shall be relevantly adjusted according to the phase difference between the cancellation signal and the interference signal.

In one embodiment of the present invention, the aforesaid interference signal is an echo signal, and the cancellation signal generator 12 is an echo canceller. Normally, the embodiment can be applicable to the system having the transmitter and the receiver located at the same side of an HDMI Ethernet channel. In another embodiment, the interference signal is a crosstalk signal, and the cancellation signal generator 12 is a crosstalk canceller. For example, this embodiment can be applied to a network system that the transmitter and the receiver are connected with different ports of the same network exchanger. In some network exchangers, multi-port transformers are introduced to save the cost as well as the PCB size. Yet, due to limited spacing between coils of the adjacent ports, near-end crosstalk (NEXT) interference is highly possible. For the clock domains for different ports might be close but different, the interference cancellation apparatus of the present invention is pretty suitable for the aforesaid system to get rid of the crosstalk interference that is originally untouchable by the conventional interference cancellation devices or methods.

Figure 2:
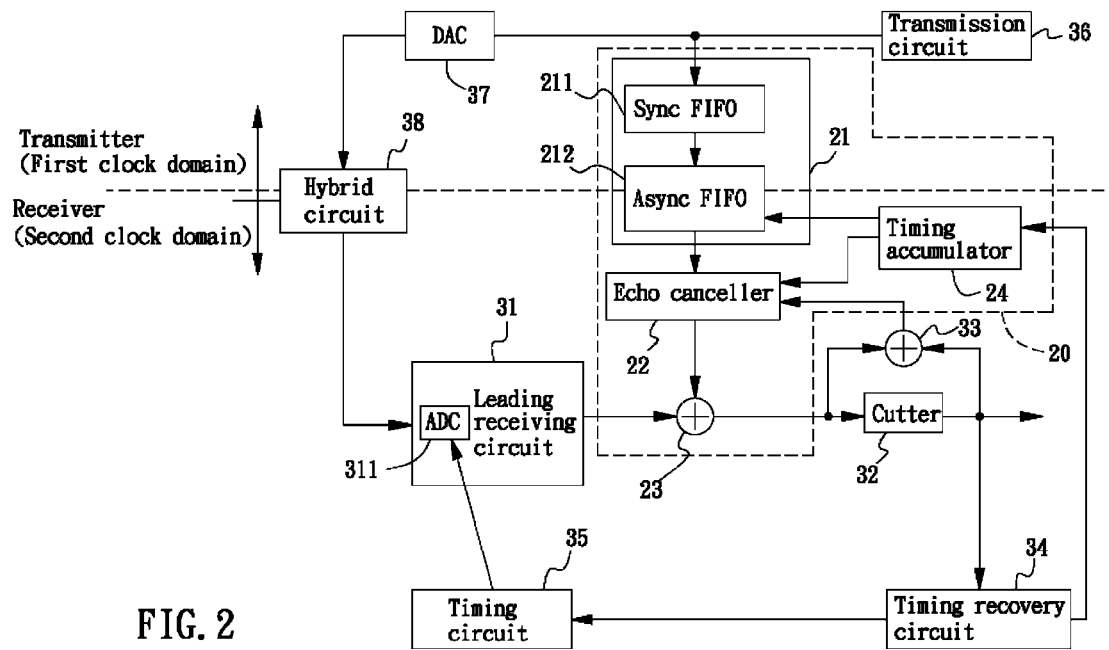
FIG. 2 is a detailed block diagram showing a preferred embodiment of the interference cancellation apparatus in accordance with the present invention.

Referring now to FIG. 2, a preferred embodiment of the interference cancellation apparatus 20 in accordance with the present invention is illustrated in a block diagram form. The interference cancellation apparatus 20 is constructed between a transmitter operated in a first clock domain and a receiver operated in a second clock domain, in which the transmitter and the receiver are located at the same side of the same channel via a hybrid circuit 38. The transmitter has its own clock domain (i.e. the first clock domain), and the receiver is synchronized by adopting loop timing to lock on the partner transmitter and thus to make itself to have a different clock domain (i.e. the second clock domain). Thereupon, the interference cancellation apparatus 20 is needed to cancel the possible echo across the different clock domains. As shown, the interference cancellation apparatus 20 include an FIFO circuit 21, an echo canceller 22, an adder 23 and a timing accumulator 24. The FIFO circuit 21 further includes a synchronic (Sync) FIFO unit 211 and an asynchronic (Async) FIFO unit 212. In FIG. 2, a digital signal outputted from the transmission circuit 36 of the transmitter is transformed into a corresponding analog signal via a digital/analog (D/A) transformer 37, and the analog signal is then forwarded to the hybrid circuit 38 for undergoing a channel transmission. The Sync FIFO unit 211 receives the digital transmission signal in the first clock domain, in which the digital transmission signal includes a plurality of sampled points and part of the sampled points can be stored temporarily in the Sync FIFO unit 211 for further possible output of the Async FIFO unit 212. The Async FIFO unit 212 bases on an accumulated timing difference between the first clock domain and the second clock domain to perform one of the following output processes in each timing of the second clock domain: outputting one of the sampled points (in normal situation), outputting two consecutive points of the sampled points (additional outputting thereinafter), and outputting no sampled point (skip outputting thereinafter). If the accumulated timing difference between the first and the second clock domains is less than a clock period (i.e. less than a sampling interval), the Async FIFO unit 212 would retrieve regularly a sample point from the Sync FIFO unit 211. Namely, neither additional outputting nor skip outputting is needed. If the first clock domain is faster than the second clock domain and the accumulated timing difference reaches a clock period (i.e. as the second clock domain is lagged by a sampled point), the Async FIFO unit 212 would retrieve two consecutive sample points at a time from the Sync FIFO unit 211 so as to catch up the first clock domain. Further, if the first clock domain is slower than the second clock domain and the accumulated timing difference reaches a clock period (i.e. as the second clock domain is advanced by a sampled point), the Async FIFO unit 212 would retrieve no sampled point from the Sync FIFO unit 211 so as to have the first clock domain to catch up.

As shown in FIG. 2, the receiver can include a mechanism (for example, the timing recovery circuit 34) for detecting the timing difference between the first and the second clock domains. The timing recovery circuit 34 can detect if the current receiving timing is faster or slower than the party transmission timing. If faster, the timing recovery circuit 34 would inform a timing circuit 35 to speed up the receiving timing for the A/D converter (ADC) 311. If slower, the timing recovery circuit 34 would inform a timing circuit 35 to slow down the receiving timing for the A/D converter (ADC) 311 so as to lock on the party's transmission timing. Upon such an arrangement, the timing accumulator 24 of the interference cancellation apparatus 20 can base on each detecting of the timing recovery circuit 34 to accumulate the count in speeding-up or slowing-down. As soon as the count reaches a value standing for the situation of advancing a clock period or a sampling interval, the timing accumulator 24 would inform the Async FIFO unit 212 to perform the skip outputting. On the other hand, if the count reaches a value standing for the situation of lagging a clock period or a sampling interval, the timing accumulator 24 would inform the Async FIFO unit 212 to perform the additional outputting. In one embodiment of the present invention, the timing circuit 35 is a phase-lock loop (PLL), the timing accumulator 24 is a phase accumulator, and the accumulated timing difference is an accumulated phase difference. For example of a 64-phase PLL, if the count in the phase accumulator reaches 64 in advancing situation or 64 in lagging situation, then the Async FIFO unit 212 would be informed to perform the skip outputting or the additional outputting, respectively. In another embodiment, the timing circuit 35 is a voltage-controlled oscillator (VCO), the timing accumulator 24 is a frequency accumulator, and the accumulated timing difference is thus an accumulated frequency difference. Then, adjusting in frequency can be calculated or mapped into corresponding adjusting in phase, and thus the critical or the threshold count for performing the skip or the additional outputting in the frequency accumulator can be determined.

The echo canceller 22, resembled to the cancellation signal generator 12 of FIG. 1, can base on the sampled points of the digital transmission signal outputted by the Async FIFO unit 212 to generate a cancellation signal for deleting an echo signal received by the receiver. Further, the echo canceller 22 can base on a phase difference between the cancellation signal and the echo signal to adjust the cancellation signal for reducing or completely wiping off the phase difference. The adder 23 receives a digital receiving signal (containing the echo signal) and the cancellation signal from the leading receiving circuit 31 and the echo canceller 22, respectively, so as to subtract the cancellation signal from the digital receiving signal for performing the echo cancellation process. In addition, the receiver can further include a cutter 32 and another adder 33. The cutter 32 is to cut off the output signals of the adder 23 so as to process transformation of a series of value levels. The adder 33 is to calculate the difference between the foregoing value levels and the raw signal values before the cutting and further to send the difference back to the echo canceller 22 for evaluating the phase difference between the echo signal and the interference signal and for further providing the echo canceller 22 to generate the cancellation signal.

Figure 3A:
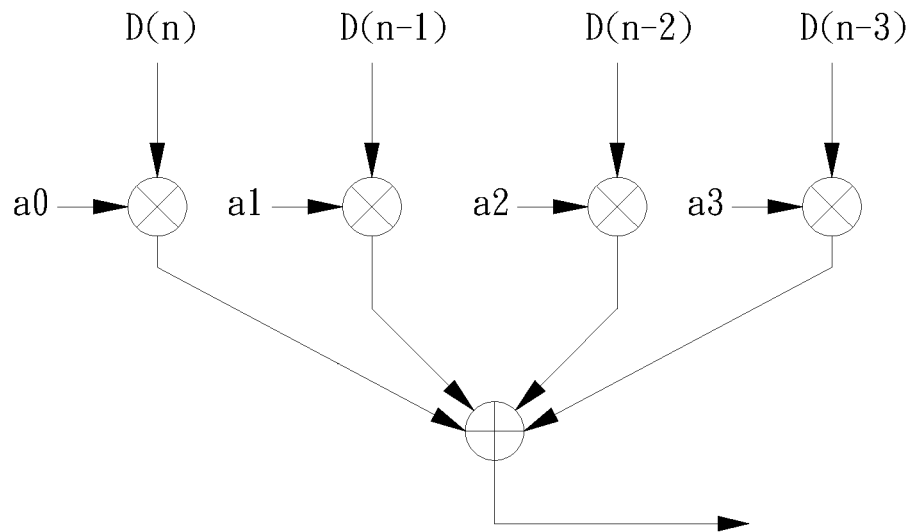
FIG. 3A through FIG. 3D show consecutively how the echo canceller of FIG. 2 responds to the unsynchronized FIFO unit for adjusting the relationship between the tap coefficients and the sampling values.
Figure 3B:
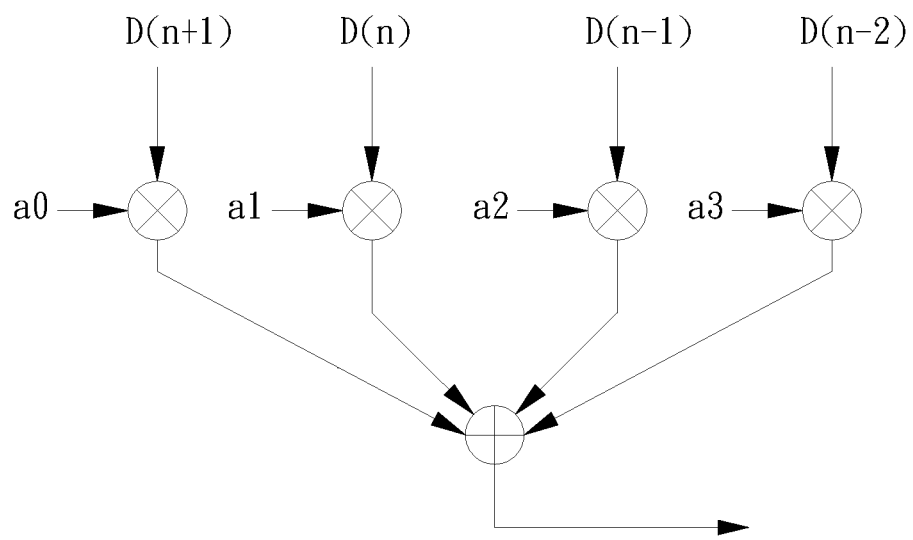

When the timing accumulator 24 informs the Async FIFO unit 212 to perform the additional or the skip outputting, the echo canceller 22 is also informed to adjust internally for maintaining the continuity of the cancellation signals. In one embodiment, the echo canceller 22 is a filter having a plurality of taps, and the relationship between the coefficient of each tap and the corresponding sampled point of the digital transmission signal is adjusted according to the output pattern of the Async FIFO unit 212 so as to keep substantially the time continuity. Give an example of an FIR filter as an echo canceller 22 to have four taps, with four sampled values at corresponding taps being denoted as D(n), D(n−1), D(n−2) and D(n−3), respectively, and four coefficients for the corresponding taps being denoted as a0, a1, a2 and a3, as shown in FIG. 3A. If neither the additional outputting nor the skip outputting is performed, a new sampled value D(n+1) would appear as normally expected at the next timing, and the oldest sampled value D(n−s) would be abandoned simultaneously. To maintain the continuity in relationship between the coefficients and the sampled values of the taps, the coefficients for the taps are kept in order as the same a0, a1, a2 and a3, as shown in FIG. 3B. If an abnormal situation is met in the next timing to require an additional outputting, then the sampled values for the taps become D(n+2), D(n+1), D(n) and D(n−1). Namely, two sampled values D(n+1) and D(n+2) are obtained at a the same timing.

Figure 3C:
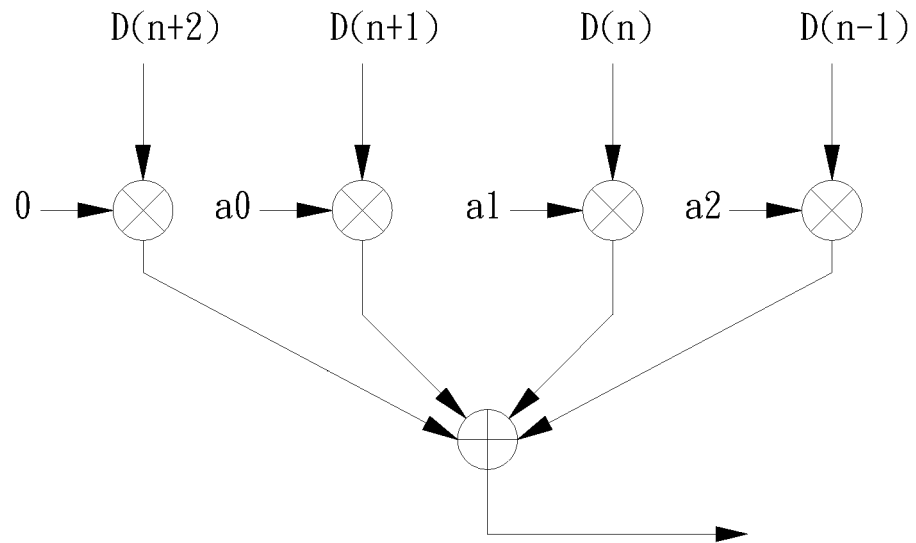
Figure 3D:
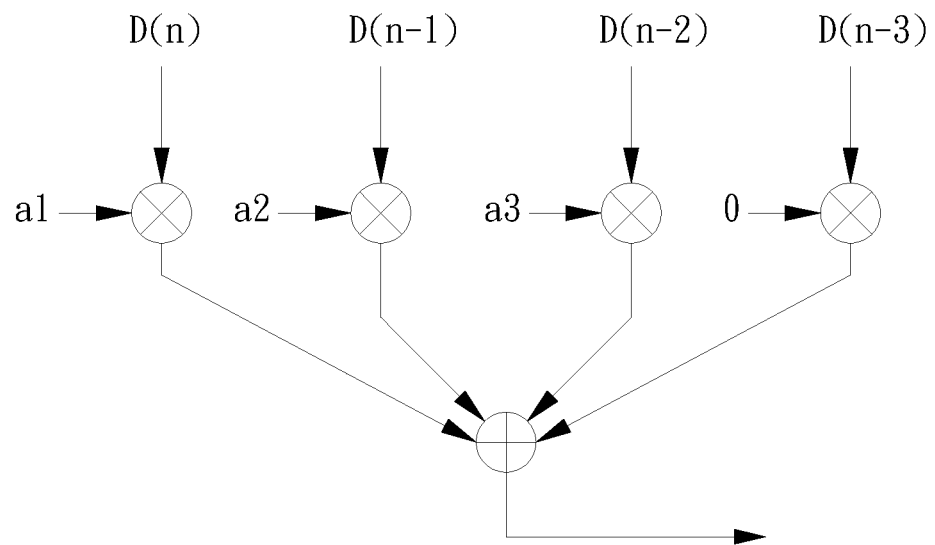

However, to keep the related continuity, coefficients of the taps are advanced by a tap to become 0, a0, a1 and a2 (0 is appeared due to the D(n+2) is additional without generating a new coefficient for the corresponding tap), as shown in FIG. 3C. On the other hand, if the abnormal situation is met in the next timing to require a skip outputting, then the sampled values for the taps become D(n), D(n−1), D(n−2) and D(n−3). Namely, no new sampled value is added. At this time, coefficients of the taps are shifted backward by a tap to become a1, a2, a3 and 0 (0 is appeared due to the D(n−3) is to be abandoned normally), as shown in FIG. 3D.

Figure 4A:
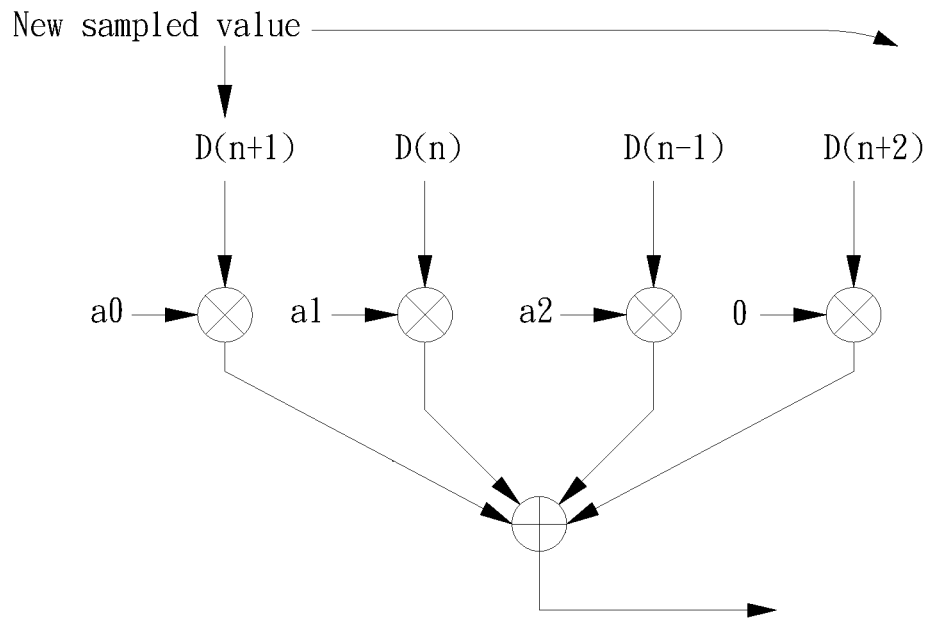
FIG. 4A and FIG. 4B show consecutively another aspect how the echo canceller of FIG. 2 responds to the unsynchronized FIFO unit for adjusting the relationship between the tap coefficients and the sampling values.
Figure 4B:
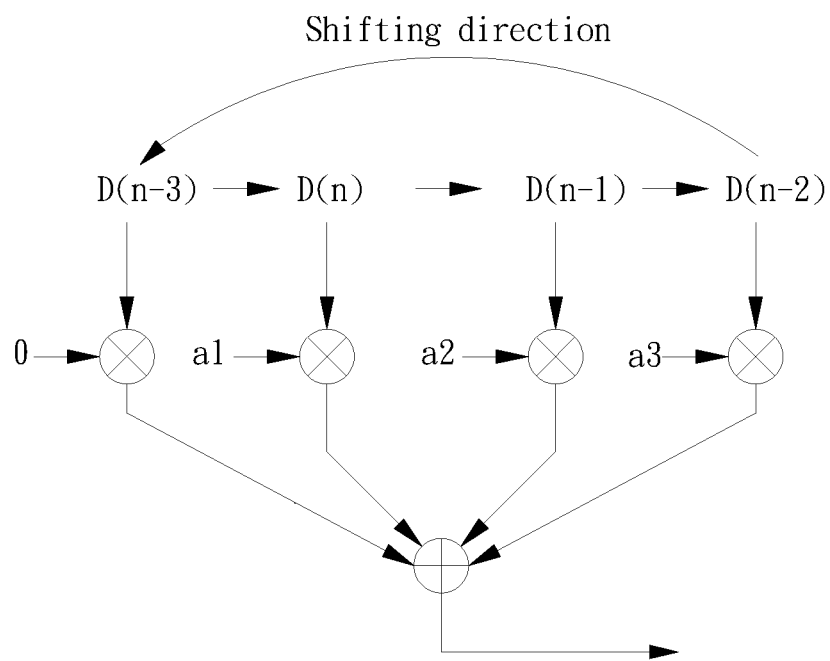

Another aspect of the present invention that can still hold the aforesaid related continuity is to maintain the coefficients of the taps but shifting the sampled values adequately. For example, if an additional outputting is needed, the sampled values in FIG. 3A are advanced by a tap, and the hole formed by kicking off the D(n) is now filled by the new sampled value D(n+1), and another new sampled value D(n+2) directly overwrite the original D(n−2) hole with resetting 0 to the corresponding coefficient of the tap, as shown in FIG. 4A. It is noted that the scheme provided by FIG. 3C can be obtained in FIG. 4A. On the other hand, if a skip outputting is needed, all the sampled values in FIG. 3A are shifted by advancing a tap, the old leading sampled value D(n−3) is shifted back to the old D(n) hole, and the coefficient of the tap corresponding to the D(n−3) is now reset to 0 as shown in FIG. 4B. It is also noted that the scheme provided by FIG. 3D can now be obtained in FIG. 4B.

Figure 5:
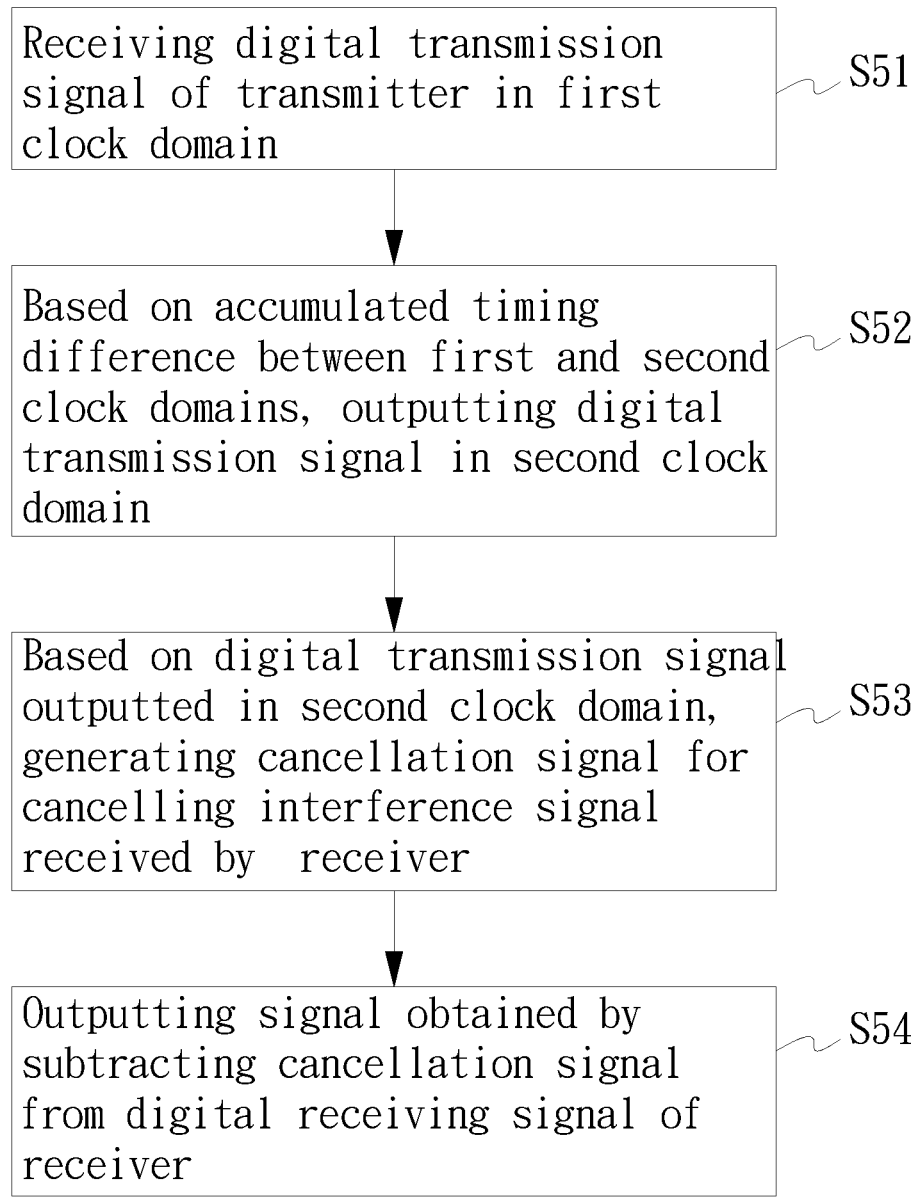
FIG. 5 is a flowchart of an embodiment of the interference cancellation method in accordance with the present invention.

Referring now to FIG. 5, a flowchart of an embodiment of the interference cancellation method in accordance with the present invention is shown. The interference cancellation method can be applied to a communication system that includes a transmitter operated in a first clock domain and a receiver operated in a second clock domain. Step S51 is to receive a digital transmission signal of the transmitter in the first clock domain. Step S52 is to output the transmission signal in the second clock domain based on an accumulated timing difference between the first clock domain and the second clock domain, in which the accumulated timing difference can be an accumulated phase difference or an accumulated frequency difference. Step S53 is to generate a cancellation signal for cancelling an interference signal received by the receiver, based on the digital transmission signal outputted in the second clock domain, in which the interference signal is generated for responding the digital transmission signal. Further in Step S53, a phase difference between the interference signal and the cancellation signal can be also used to adjust the cancellation signal. Finally in Step S54, for the interference signal is contained as a part in a digital receiving signal of the receiver, the interference cancellation is performed by subtracting the cancellation signal from the digital receiving signal.

In one embodiment of the present invention, the interference signal is an echo signal. In particular, this embodiment is applicable to the system having the transmitter and the receiver located at the same side of an HDMI Ethernet channel. In another embodiment, the interference signal is a crosstalk signal. For example, this embodiment can be applied to a network system that the transmitter and the receiver are connected with different ports of the same network exchanger.

Preferably, the digital transmission signal can includes a plurality of sampled points. Step S52 can base the accumulated timing difference between the first clock domain and the second clock domain to perform one of the following output processes in each timing of the second clock domain: outputting one of the sampled points, outputting two consecutive points of the sampled points, and outputting no sampled point. Details thereabout are described as follows.

(1) If the first clock domain is faster than the second clock domain and the accumulated timing difference reaches a clock period, Step S52 is to output two consecutive sample points at a time from the sampled points.

(2) If the first clock domain is slower than the second clock domain and the accumulated timing difference reaches a clock period, Step S52 is to output no sampled point.

(3) If the accumulated timing difference hasn't reached a clock period, Step S52 is to output one of the sampled points.

In summary, by providing the interference cancellation apparatus and the corresponding method in accordance with the present invention, the interference cancellation across different clock domains is processed by two parts: an integral portion and a decimal portion. The integral portion is handled by having the sampled point to be advanced or lagged to match the tap during a switching of clock domains, and is processed by an Async FIFO unit. The decimal portion is used to swiftly track the response of the interference signal with various phases while in generating the cancellation signal for interference cancellation, and can be processed by an adaptive regression algorithm with an enlarged increment. Upon such an arrangement for performing the interference cancellation during crossing clock domains, complexity in system structuring and circuiting can be greatly reduced.

While the present invention has been particularly shown and described with reference to a preferred embodiment, it will be understood by those skilled in the art that various changes in form and detail may be without departing from the spirit and scope of the present invention.

What is claimed is:

1. An interference cancellation apparatus, applicable to a communication system that includes a transmitter operated in a first clock domain and a receiver operated in a second clock domain, comprising:

a First-In-First-Out (FIFO) circuit, receiving a digital transmission signal of the transmitter in the first clock domain and outputting the digital transmission signal in the second clock domain according to an accumulated timing difference between the first clock domain and the second clock domain, the digital transmission signal including a plurality of sampled points, the FIFO circuit further including:

a synchronic (Sync) FIFO unit, receiving the sampled points in the first clock domain and storing temporarily part of the sampled points; and an asynchronic (Async) FIFO unit coupled with the Sync unit for basing on the accumulated timing difference to perform one of following output processes in each timing of the second clock domain: outputting one of the sampled points, outputting two consecutive points of the sampled points, and outputting no sampled point; and a cancellation signal generator, coupled with the FIFO circuit, generating a cancellation signal based on the digital transmission signal for cancelling an interference signal received by the receiver;

wherein the interference signal is generated in response to the digital transmission signal, and the cancellation signal generator adjusts the cancellation signal according to a phase difference between the interference signal and the cancellation signal.

2. The interference cancellation apparatus according to claim 1, wherein said interference signal is contained in a digital receiving signal of said receiver, and said interference cancellation apparatus further includes an adder for subtracting said cancellation signal from the digital receiving signal.

3. The interference cancellation apparatus according to claim 1, wherein said interference signal is an echo signal and said cancellation signal generator is an echo canceller.

4. The interference cancellation apparatus according to claim 3, wherein said transmitter and said receiver are located at a same side of an HDMI (High-Definition Multimedia Interface) Ethernet channel for performing transmitting and receiving, respectively.

5. The interference cancellation apparatus according to claim 1, wherein said interference signal is a crosstalk signal and said cancellation signal generator is a crosstalk canceller.

6. The interference cancellation apparatus according to claim 5, wherein said transmitter and said receiver are connected with different ports of a network exchanger.

7. The interference cancellation apparatus according to claim 1, wherein said accumulated timing difference is an accumulated phase difference, and said interference cancellation apparatus further includes a phase accumulator for generating the accumulated phase difference between said first clock domain and said second clock domain.

8. The interference cancellation apparatus according to claim 1, wherein said accumulated timing difference is an accumulated frequency difference, and said interference cancellation apparatus further includes a frequency accumulator for generating the accumulated frequency difference between said first clock domain and said second clock domain.

9. The interference cancellation apparatus according to claim 1, wherein said Async FIFO unit outputs two consecutive points of said sampled points upon when said first clock domain is faster than said second clock domain and said accumulated timing difference reaches a clock period.

10. The interference cancellation apparatus according to claim 1, wherein said Async FIFO unit outputs no sampled point upon when said first clock domain is slower than said second clock domain and said accumulated timing difference reaches a clock period.

11. The interference cancellation apparatus according to claim 1, wherein said Async FIFO unit outputs one of said sampled points upon when said accumulated timing difference hasn't reached a clock period.

12. The interference cancellation apparatus according to claim 1, wherein said cancellation signal generator includes a plurality of taps having individual coefficients, and relationship between the coefficients and said corresponding sampled points is adjusted according to an output pattern of said Async FIFO unit.

13. An interference cancellation method, applicable to a communication system that includes a transmitter operated in a first clock domain and a receiver operated in a second clock domain, the interference cancellation method comprising the steps of:

receiving a digital transmission signal of the transmitter in the first clock domain;

outputting the digital transmission signal in the second clock domain based on an accumulated timing difference between the first clock domain and the second clock domain; and generating a cancellation signal for cancelling an interference signal received by the receiver, based on the digital transmission signal outputted in the second clock domain, in which the interference signal is generated for responding the digital transmission signal, in which the cancellation signal is adjusted based on a phase difference between the interference signal and the cancellation signal;

wherein the digital transmission signal includes a plurality of sampled points, and the step of outputting the digital transmission signal is based on the accumulated timing difference to perform one of following output processes in each timing of the second clock domain: outputting one of the sampled points, outputting two consecutive points of the sampled points, and outputting no sampled point.

14. The interference cancellation method according to claim 13, wherein said interference signal is contained in a digital receiving signal of said receiver, and said interference cancellation method further includes a step of outputting a signal formed by subtracting said cancellation signal from the digital receiving signal.

15. The interference cancellation method according to claim 13, wherein said interference signal is an echo signal.

16. The interference cancellation method according to claim 15, wherein said transmitter and said receiver are located at a same side of an HDMI (High-Definition Multimedia Interface) Ethernet channel for performing transmitting and receiving, respectively.

17. The interference cancellation method according to claim 13, wherein said interference signal is a crosstalk signal.

18. The interference cancellation method according to claim 17, wherein said transmitter and said receiver are connected with different ports of a network exchanger.

19. The interference cancellation method according to claim 13, wherein said accumulated timing difference is one of an accumulated phase difference and an accumulated frequency difference.

20. The interference cancellation method according to claim 13, wherein said step of outputting the digital transmission signal is to output two consecutive points of said sampled points upon when said first clock domain is faster than said second clock domain and said accumulated timing difference reaches a clock period.

21. The interference cancellation method according to claim 13, wherein said step of outputting the digital transmission signal is to output no sampled point upon when said first clock domain is slower than said second clock domain and said accumulated timing difference reaches a clock period.

22. The interference cancellation method according to claim 13, wherein said step of outputting the digital transmission signal is to output one of said sampled points upon when said accumulated timing difference hasn't reached a clock period.

* * * * *